(12) United States Patent
Healy et al.

(10) Patent No.: US 10,504,107 B2
(45) Date of Patent: Dec. 10, 2019

(54) SYSTEM AND METHOD FOR MOBILE CHECKOUT

(71) Applicant: MasterCard International Incorporated, Purchase, NY (US)

(72) Inventors: Todd Allan Healy, Brooklyn, NY (US); Stephanie Yim, Fresh Meadows, NY (US)

(73) Assignee: Mastercard International Incorporated, Purchase, NY (US)

( * ) Notice: Subject to any disclaimer, the term of this patent is extended or adjusted under 35 U.S.C. 154(b) by 767 days.

(21) Appl. No.: 15/063,099

(22) Filed: Mar. 7, 2016

(65) Prior Publication Data
US 2016/0260090 A1 Sep. 8, 2016

Related U.S. Application Data

(60) Provisional application No. 62/129,455, filed on Mar. 6, 2015.

(51) Int. Cl.
*G06Q 40/00* (2012.01)
*G06Q 20/36* (2012.01)
*G06Q 20/32* (2012.01)

(52) U.S. Cl.
CPC ........... *G06Q 20/367* (2013.01); *G06Q 20/32* (2013.01)

(58) Field of Classification Search
CPC ..................................................... G06Q 20/32
USPC ........................................................ 705/41
See application file for complete search history.

(56) References Cited

U.S. PATENT DOCUMENTS

| | | |
|---|---|---|
| 2010/0153265 A1 | 6/2010 | Hershfield et al. |
| 2012/0124676 A1 | 5/2012 | Griffin et al. |
| 2012/0304112 A1 | 11/2012 | Cutler et al. |
| 2014/0324690 A1* | 10/2014 | Allen ..................... G06Q 20/36 705/41 |
| 2015/0066691 A1 | 3/2015 | Ready et al. |

OTHER PUBLICATIONS

Business Wire; "V.me by Visa Adds More Top eCommerce Retailers, Simplifying Checkout for consumers"; New York, Oct. 15, 2012 (Year: 2012).*
"Canadian Office Action" Jul. 9, 2018 (Sep. 7, 2018), Innovation, Science and Economic Development Canada, Canadian Intellectual Property Office, for Canadian Application No. 2,978,456, 4pgs.
"PCT Search Report and Written Opinion", dated May 26, 2016, for International Application No. PCT/US2016/21228, 9 pp.

* cited by examiner

*Primary Examiner* — Edward Chang
(74) *Attorney, Agent, or Firm* — Buckley, Maschoff & Talwalkar LLC

(57) ABSTRACT

Provided are a system and method for a mobile payment. In one example, the method may include determining an amount of digital wallets installed on a mobile device, and in response to determining that a plurality of digital wallets are installed on the mobile device, displaying a smart button on a merchant checkout page. When the smart button is selected by a user of the mobile device, the method may further include displaying a payment option selection screen that enables the user of the mobile device to select a payment card from any digital wallet from among the plurality of digital wallets as a method of payment for the transaction.

18 Claims, 14 Drawing Sheets

SYSTEM AND METHOD FOR MOBILE CHECKOUT

CROSS-REFERENCE TO RELATED APPLICATION

The present application claims the benefit under 35 USC § 119(e) of U.S. Provisional Patent Application No. 62/129,455, filed on Mar. 6, 2015, in the United States Patent and Trademark Office, the entire contents of which are hereby incorporated by reference for all purposes.

FIELD

Exemplary embodiments described herein relate generally to electronic transactions for payment of goods and/or services and, more particularly, to methods and devices which may provide a mobile user interface that may support multiple independent payment options within a single view.

BACKGROUND

Payment card accounts such as credit card accounts and debit card accounts are in widespread use. In one conventional manner of accessing a payment card account, the cardholder presents a plastic card at a point of sale in a retail store. The point of sale device may read account information from the card (e.g., via a magnetic stripe or through wireless communication with an integrated circuit in the card, or via electrical contacts on the card) and initiate a payment card account transaction using the information read from the card.

Payment card accounts are also widely used in e-commerce. For example, a cardholder may use a computer or a smartphone to access a merchant's online store webpage. After selecting goods for purchase and then opting to check out, the cardholder may be prompted to enter payment card account information into a data entry screen that has been downloaded to the cardholder's computer (or smartphone). In response, the merchant's e-commerce host computer may initiate a payment card account transaction using the information that was entered by the account holder.

Many cardholders own multiple payment card accounts. According to one type of proposed arrangement, a cardholder may store one or more of their payment card accounts within a digital wallet that is offered by a wallet service provider. That is, a user (i.e., a cardholder) may cause one or more of their payment card accounts to be enrolled in the digital wallet, and the wallet service provider may store sensitive information from the one or more payment card accounts in a data partition that is dedicated to the user thereby forming a digital wallet. When the user seeks to check out during an e-commerce shopping transaction, the user may be given an option to access a digital wallet stored by the digital service provider.

As a result of data communication among the user's computer, the merchant's e-commerce host computer, and the wallet service provider's computer, the user may be presented with an option to select an enrolled payment card account for use in a current e-commerce transaction. To select the payment account may require only one or two "clicks" or "taps" on the part of the user. Once the user selects the desired payment account from the digital wallet, the merchant may use the corresponding account information to initiate a payment card account transaction using the payment account selected by the user. This type of arrangement may offer great convenience to the user, because the user is freed from entering the payment card account information details as part of the e-commerce transaction. At the same time, the user is not required to have payment card account information stored on the merchant's e-commerce computer.

However, a merchant site or merchant application typically only allows a user to view a single digital wallet at a time. In other words, the user is only allowed to view payment options or payment cards from one digital wallet at a time, even in a case where the user has multiple digital wallets installed on their device and available for payment with the merchant.

BRIEF DESCRIPTION OF THE DRAWINGS

Features and advantages of the exemplary embodiments, and the manner in which the same are accomplished, will become more readily apparent with reference to the following detailed description taken in conjunction with the accompanying drawings, in which.

Figure 1:
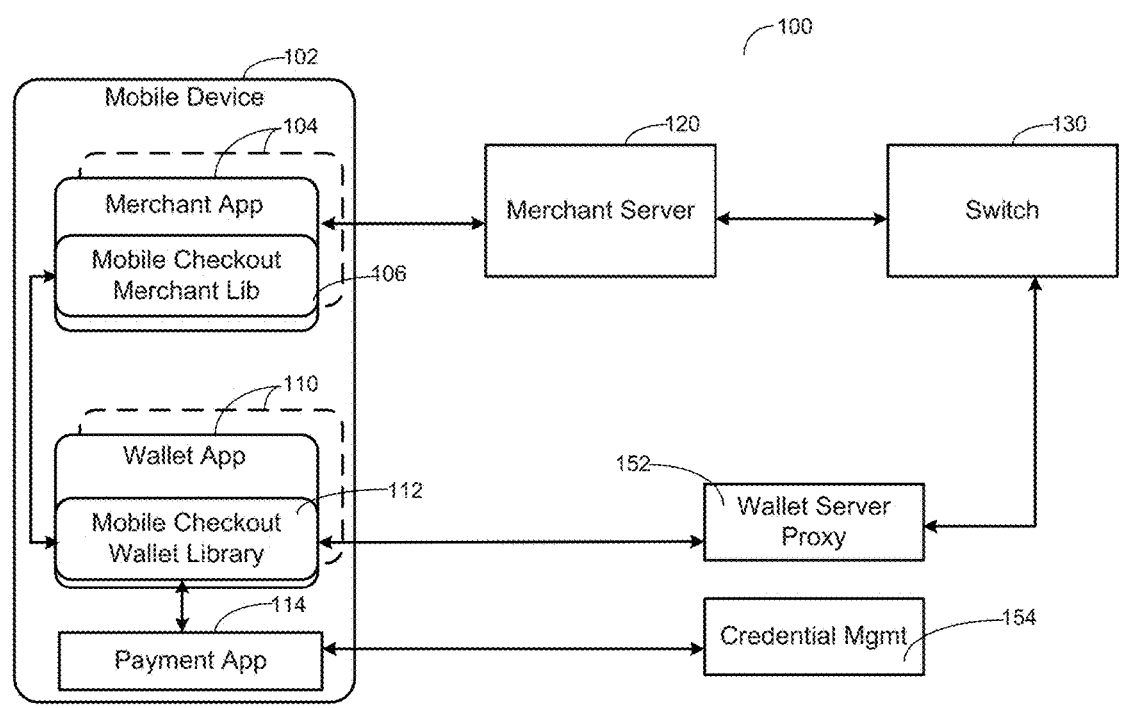
FIG. 1 is a diagram illustrating an example of a mobile payment network in accordance with an exemplary embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various exemplary embodiments. It should be appreciated that various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

In general, and for the purpose of introducing concepts of the present invention, one or more exemplary embodiments relate to payment card systems in which mobile devices (such as mobile phones or other portable devices) are used for remote payment transactions. In some embodiments, a digital secure remote payment service is provided which enables secure mobile originated transactions for remote payments with merchants or other service providers. The transactions may contain dynamic data (e.g., cryptograms) generated by a payment application in the mobile device to secure the transaction. Transactions, in some embodiments, require cardholder verification, and the dynamic data included in the transactions provides evidence that the cardholder verification has been performed. While some illustrative embodiments herein are described in the context of a mobile device, such payment transactions may be initiated on a mobile browser, mobile application, by shopping on a personal computer, tablet, television, appliance, or from static media such as posters, shop displays and magazines.

According to various exemplary embodiments, a wallet system is provided that allows a user to access a plurality of wallet applications and payment options included therein from a single view or window displayed on a mobile device. Further, in some embodiments, the wallet applications may be accessed from within one or more merchant applications, for example, a retailer shopping application, and the like. When a user attempts to navigate to a checkout page of the merchant, for example, through a merchant mobile application installed on the mobile device, the mobile device may determine an amount of digital wallets that are presently installed therein. For example, if a plurality of digital wallets are installed on the mobile device, the mobile device may display a smart button embedded within the merchant checkout page or as a separate button/link with respect to the merchant checkout page. When the smart button is selected by the user, the mobile device may display a payment option screen or window that enables the user of the mobile device to select a payment card from any digital wallet from among a plurality of digital wallets as a method of payment for the transaction. According to various exemplary embodiments, the payment option screen may simultaneously display all payment options from multiple independent digital wallets enabling a user to select from any of the payment options from within a single view.

Various exemplary embodiments are directed towards a mobile based remote payment system that makes uses of payment applications residing on a mobile device to allow secure payments to a merchant. Examples herein relate to the user experience such as for a cardholder, whereby the cardholder may initiate payment from a merchant mobile application, view and select the payment card to be used for payment from amongst all the digital wallets available on the mobile device, view offers and rewards associated with the one or more of the available cards, enter shipping details, and select shipping options. Accordingly, the cardholder may complete the checkout through authentication in the selected digital wallet application without interrupting the mobile merchant application, enabling the digital wallet to generate secure transaction credentials which are returned to the merchant through a central trusted entity (the MasterPass switch in the accompanying documentation). The transaction credentials may be generated by a mobile payment application, which may be a software application running in the main processor of the mobile device, or in a secured application environment (such as a Trusted Execution Environment), or on a separate tamper resistant hardware component (a Secure Element).

The exemplary embodiments include multiple advantages, for example, discovery of all digital wallets and cards associated therewith on a mobile device and use of a smart button to expose the service when available cards are present on the mobile device, allowing a user to view and choose payment cards from across multiple digital wallets on the mobile device. Also provided is a secure container based presentation of wallets and cards in a merchant application. The exemplary embodiments also include the use of a central trusted entity to return card data to the merchant, use of a central trusted entity to validate that a mobile application claiming to be a wallet is legitimate, use of a central trusted entity to validate that that the application requesting payment is from a legitimate merchant, a new channel of promotion to be used by wallet and card issuers to display offers during the checkout process related to individual wallets or cards, and use of a wallet proxy to enable the distribution of an issuer wallet across multiple mobile devices rather than central storage.

As used herein, the term "wallet" or "digital wallet" is used to refer to a collection of one or more payment instruments, typically offered by a financial issuer to a cardholder. A cardholder may have multiple payment instruments (such as credit cards, debit cards, private label cards, loyalty cards, or the like) or "payment cards" where the card data has been provisioned by the payment card issuer into the wallet. As another example, payment cards may be added by the cardholder with no integration with the issuer. According to various exemplary embodiments, a network is provided and may include a plurality of wallets and wallet providers, and a central switch managed by a processing entity such as the assignee of the present application. For example, the central switch may be the MasterPass® Switch operated by MasterCard International Incorporated. The central switch provides a single point of contact for merchants which have been configured to accept payment cards in digital wallets pursuant to the exemplary embodiments described herein. FIG. 1 illustrates a mobile payment network including an example wallet infrastructure having a switch.

Referring to FIG. 1, a user may operate a mobile device 102 that executes software including one or more merchant applications 104, one or more wallet applications 110, and one or more payment applications 114 to perform transactions with one or more merchant servers 120. Examples of transactions are described further below, but in general, by way of introduction, a transaction may include a user of the mobile device 102 interacting with a merchant application 104 to select one or more products or services for purchase. The merchant application 104 may communicate with a merchant server 120 and the switch 130 to initialize a checkout transaction (and to obtain a transaction identifier or token). Based on the transaction identifier or token (and other information provided by the merchant application 104), an appropriate wallet application 110 is selected and the user selects a payment device. The wallet application 110 (possibly in conjunction with a credential management system 154 or under control of a secure element on the mobile device 102) authenticates the user and provides payment device information to a wallet server 150 for association with the checkout transaction at the switch 130. Accordingly, the merchant server 120 may obtain the payment device information and the transaction information and submit an authorization request to a payment network (not shown) to process the transaction.

According to various aspects, the system 100 may be based on one or more central switches 130 which provide the interconnectivity between a plurality of merchants and a plurality of wallet applications 110 (e.g., associated with a number of cardholders and issued by a number of issuers). Each cardholder may have one or more wallet applications 110 and each wallet application 110 may hold information associated with one or more payment cards of the cardholder. During a transaction, a cardholder (operating a device such as mobile device 102) may select which wallet application 110 is to be used in the transaction. The cardholder may also or instead select a specific payment card within the selected digital wallet. In some embodiments, a cardholder may designate a payment card and/or a wallet as a preferred or default selection. Additional examples of a payment transaction conducted using the system 100 of FIG. 1 are described in co-pending, commonly assigned U.S. patent application Ser. No. 15/063,212, filed on Mar. 7, 2016, in the United States Patent and Trademark Office.

Figure 2:
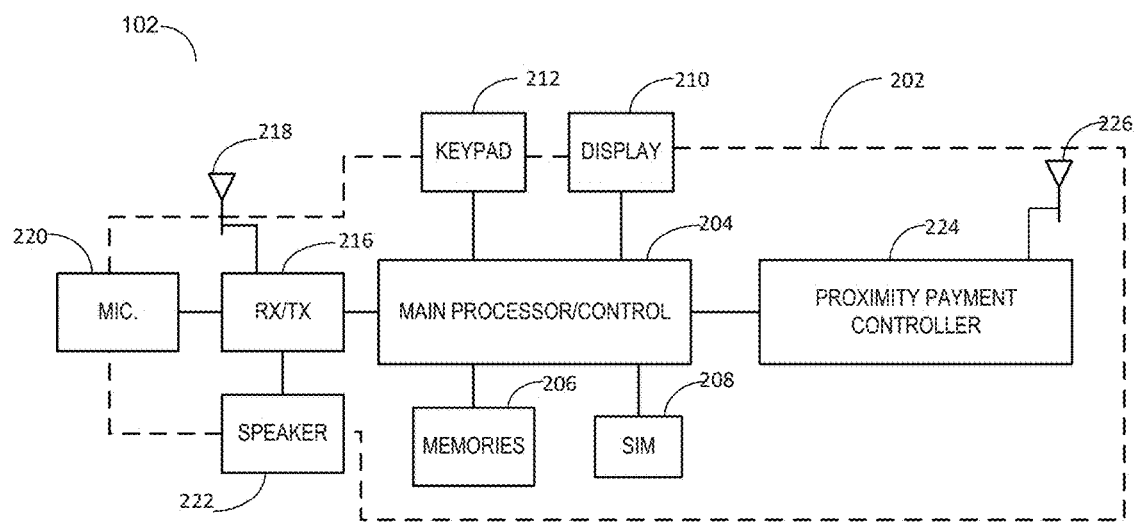
FIG. 2 is a diagram illustrating a mobile device in accordance with an exemplary embodiment.

FIG. 2 illustrates a mobile device 102 in accordance with an exemplary embodiment. For example, the mobile device 102 may be a mobile phone, a tablet, a laptop computer, a phablet, a smart watch, a smart appliance, a smart television, and the like. Also, the mobile device 102 may be conventional in its hardware aspects. Referring to FIG. 2, the mobile device 102 may include a conventional housing (indicated by dashed line 202 in FIG. 2) that contains and/or supports the other components of the mobile device 102. The housing 202 may be shaped and sized to be held in a user's hand, and may for example fit in the palm of the user's hand. In some embodiments, the housing 202 may have a different form factor (e.g., as a tablet or the like).

The mobile device 102 may include control circuitry 204, for controlling the over-all operation of the mobile device 102. For example, the control circuitry 204 may include one or more processing devices, for example, a multicore processor, a reconfigurable multicore processor, and the like. Other components of the mobile device 102, which are in communication with and/or controlled by the control circuitry 204, include memory devices 206 (e.g., program and working memory, etc.); (b) a SIM (subscriber identification module) card 208; (c) a keypad 212 for receiving user input; and (d) a display component 210 which may include a display screen for displaying output information to the user. In some embodiments, the keypad 212 will be understood to include, e.g., a conventional 12-key telephone keypad, in addition to other buttons, switches and keys, such as a conventional rocker-switch/select key combination, soft keys, and send and end keys. As another example, the keypad 212 may be a digital keypad provided on a touch screen of the mobile device 102.

The mobile device 102 may also include receive/transmit circuitry 216 that is in communication with and/or controlled by the control circuitry 204. The receive/transmit circuitry 216 is coupled to antenna 218 and may provide the communication channel(s) by which the mobile device 102 communicates via one or more communications networks (not shown). The receive/transmit circuitry 216 may operate both to receive and transmit voice signals, in addition to performing data communication functions, such as GPRS (general packet radio service) communications. For example, the receive/transmit circuitry 216 may connect the mobile device 102 to a network such as the Internet, a cellular network, and the like. Accordingly, a user of the mobile device 102 may control the mobile device 102 to navigate to websites on the World Wide Web, download mobile applications, and the like.

The mobile device 102 may further include a microphone 220, coupled to the receive/transmit circuitry 216. The microphone 220 may receive voice input from the user of the mobile device 102. In addition, a loudspeaker 222 is included to provide sound output to the user, and is coupled to the receive/transmit circuitry 216. In this example, the receive/transmit circuitry 216 may transmit, via the antenna 218, voice signals generated by the microphone 220, and reproduce, via the loudspeaker 222, voice signals received via the antenna 218. The receive/transmit circuitry 216 may also handle transmission and reception of text messages, video streams, mobile applications, and other data communications via the antenna 218.

The mobile device 102 may also include a payment circuit 224 and a loop antenna 226, coupled to the payment circuit 224. The payment circuit 224 may include functionality that allows the mobile device 102 to function as a contactless payment device. In some embodiments, the payment circuit 224 includes a processor (not separately shown) and a memory (not separately shown) that is coupled to the processor and stores program instructions for controlling the processor. Although shown as separate from the main processor 204, the payment circuit 224 and/or its processor component may be integrated with the main processor 204. In accordance with some embodiments, the mobile device 102 may include a so-called "secure element" (not separately shown), which may be incorporated with the payment circuit 224, the memories 206, the main processor 204, the SIM card 208, and/or the like. As is familiar to those who are skilled in the art, the secure element may be constituted with a small processor and volatile and nonvolatile memory that are secured from tampering and/or reprogramming by suitable measures. The secure element may, for example, manage functions such as storing and reading out a payment card account number, and cryptographic processing. Moreover, and in accordance with aspects of the exemplary embodiments, the secure element may store and apply a cardholder verification rule and may handle receipt and verification of cardholder verification input (such as entry of a PIN). As an example of a secure element, the mobile device 102 may include a trusted platform module (TPM) for secure cryptographic processing and storage. The TPM may provide a trusted or secured application execution environment or a trusted execution environment. The trusted area may have enhanced security restrictions and limit the amount of programs that have access to the storage and programs therein.

FIGS. 3A-3E illustrate examples of screen displays of a mobile payment user interface (i.e., user interface) in accordance with exemplary embodiments. In these examples, a user (such as a cardholder) may interact with the user interface to perform payment functions. For example, referring to FIG. 3A, an initial screen display is shown illustrating a user interface that is presented to a user of a mobile device when the user is interacting with a merchant application (such as a merchant application 104 of FIG. 1) to initiate a purchase transaction. In this example, the user has selected items to purchase and has navigated to a checkout screen or merchant checkout page 302 within the merchant application 104. On the bottom of the screen are two checkout payment option buttons, with one button being smart button 304. A user's selection of the smart button 304 initiates processing pursuant to the exemplary embodiments. In some embodiments, the smart button 304 may be displayed dynamically based on the process described further below. For example, the smart button 304 may only be displayed in the event that the mobile device 102 has more than one wallet applications 110 installed on the device or more than one payment cards included in a wallet application 110. In this example, the mobile device 102 or a processor thereof may detect how many digital wallets are installed on the mobile device 102. If it is determined that a predetermined number of wallets are installed, for example, one wallet, two wallets, three or more wallets, and the like, the smart button 304 may be embedded within or displayed in conjunction with the merchant checkout page 302. As a non-limiting example, the mobile payment user interface may be controlled by an application executing on the mobile device, for example, a payment application, a merchant application, a wallet application, a combination thereof, and the like.

Figures 3A, 3B:
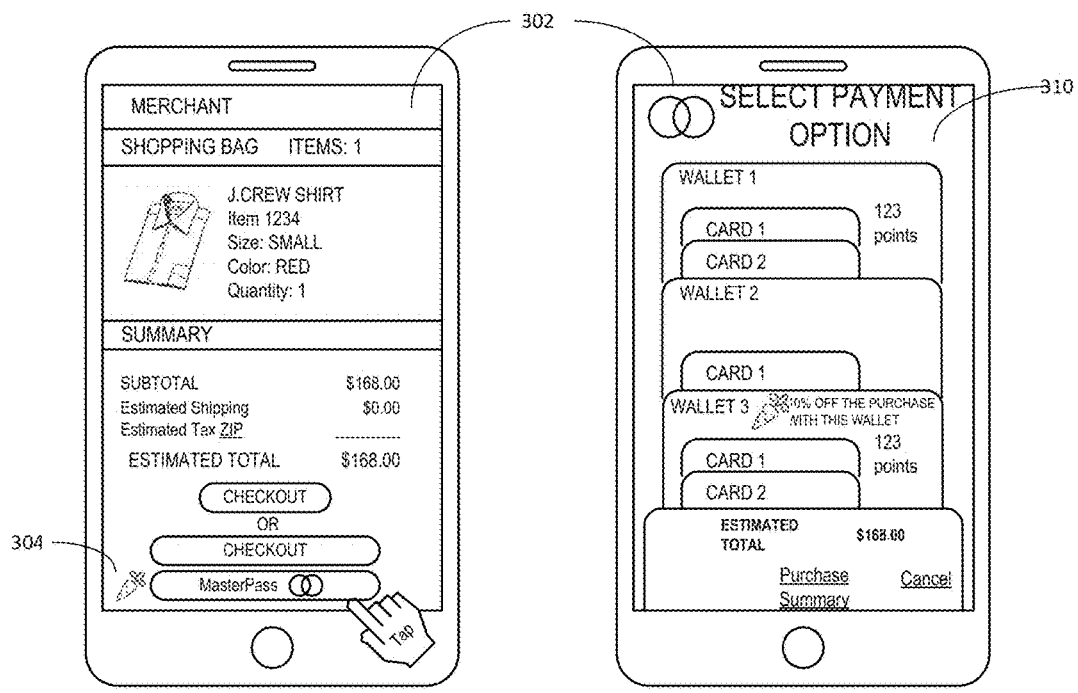
FIGS. 3A-12 are diagrams illustrating user interfaces that may be provided to a user of a mobile device in accordance with various exemplary embodiments.

Referring to FIG. 3B, a payment option screen 310 (or pane) is shown which illustrates a user interface according to various exemplary embodiments displayed as an overlay with respect to the merchant checkout page 302 screen of FIG. 3A. The payment option screen 310 simultaneously displays all wallets and associated payment options in a single view for the user, with each wallet shown in a separate "pane" or graphical/wallet pane of the screen, as well as a summary pane (at the bottom of the screen) showing a summary of the purchase. As a non-limiting example, the payment option screen 310 may be referred to as a "pay wall." In some embodiments, each graphical wallet pane displays issuer level incentives as well as any card level incentives available in the purchase transaction (e.g., rewards, incentives, promotional offers, etc.). In the example of FIG. 3B, three wallets and the corresponding panes thereof are shown, including wallet #1, wallet #2, and wallet #3. Within each wallet, displayed are graphical representations of payment cards included in the respective wallets.

According to the exemplary embodiments, payment cards may be displayed in the payment option screen 310 to appear as digital representations of an actual payment card, including any logos, banking names, and the like, which appear on a face of a physical card. In various examples, the cards are displayed in an overlapping fashion with respect to one another, and the graphical panes corresponding to the wallets are also displayed in overlapping fashion with respect to one another such that only a top portion of the graphical pane corresponding to the digital wallet and a top portion of each are visible in the view. This view may simulate the view of an actual physical wallet having cards arranged one on top of the other in cascading and overlapping order such that a top portion of each card is visible without interfering with a view of the top portion of the other cards. In this example, wallet #3 provides an issuer level incentive of "10% off this purchase" as well as a card level incentive of "est. 200 miles" which would be earned if the user selected to use payment card #1 of wallet #3 for the purchase transaction. In this example, not only are payment cards from multiple digital wallets viewable at the same time, but also any incentives available by using each payment card for the transaction are also viewable.

Figures 3C, 3D, 3E:
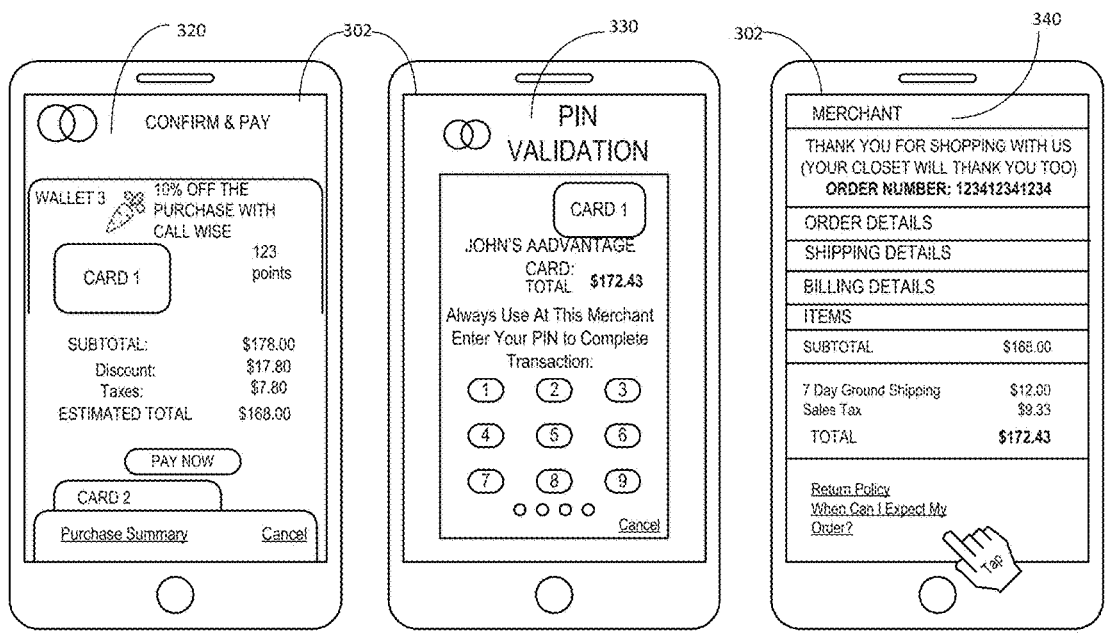

Referring to FIG. 3C, a user interface is shown which illustrates a confirm and pay screen 320 that may be displayed as an overlay to the merchant checkout screen 302 of FIG. 3A, and which may be presented after a user touches or selects a specific wallet pane from the payment option screen 310 of FIG. 3B. As shown, the user has selected to view a confirmation view pane associated with wallet #3 of FIG. 3B. The confirm and pay screen 320 shows a card image of payment card #1 (including, in some embodiments, the user's primary account number, expiration date, card art, logos, and decals) as well as the transaction total including any applied issuer level incentives and card level incentives. Further, a shipping address is shown, which may be a shipping address associated with the selected wallet. The user may modify the shipping address which is further described later herein. The primary call to action from the confirm and pay screen 320 of FIG. 3C is for the user to "Pay Now" with the selected digital wallet and card combination. Alternatively, the user can view a confirmation view pane associated with a different wallet (such as wallet 1 or wallet 2).

Referring now to FIG. 3D, a cardholder validation method ("CVM") is shown which illustrates a validation screen 330 of the user interface that may be displayed as an overlay to the merchant checkout screen 302 display of FIG. 3A, and which may be presented after a user selects the "Pay Now" button of FIG. 3C. The CVM screen prompts the user to perform a validation to the selected wallet. In the illustrated embodiment, the selected wallet (i.e., wallet #3) requires PIN validation and the user is prompted to enter their PIN. A transaction total and an option to use the selected payment card #1 and digital wallet #3 as the default card and wallet for the merchant may also be provided in the CVM screen. The user enters their PIN and the transaction is processed using the system of the exemplary embodiments.

Referring now to FIG. 3E, a transaction confirmation screen display is shown which illustrates a confirmation screen 340 that may be displayed by the merchant application 104 of FIG. 1 after the CVM screen has successfully been processed. In general, the transaction experience for the user may be as if the user did not leave the merchant application 104 to execute the payment process. Upon the transaction being successfully processed, a message (such as an SMS message or other alert) may be transmitted to the user's mobile device and displayed on the mobile device 102 (e.g., on top of the display lock screen of the mobile device 102). For example, the confirmation message may include the value of the transaction as well as information identifying the payment card used in the transaction.

In the examples of FIGS. 3A-3E, the user interface includes a plurality of screens including a payment option screen 310, a confirm and pay screen 320, and a validation screen 330. Also included is a confirmation screen 340 which may be included within a view of the merchant application 104. It should be appreciated however, that the user interface may include other screens, additional screens, different screens, and/or the like. Furthermore, the user interface may be generated at various times, for example, in response to a user of the mobile device 102 executing the merchant application, in response to the user navigating to the merchant checkout page 302 within the mobile application, and the like.

Referring again to FIG. 1, the user interface according to various exemplary embodiments may be initiated when a user initiates or opens a merchant application installed on the mobile device 102. The user interface may be generated by one or more applications executing on the mobile device, for example, a payment application, a merchant application, a wallet application, and the like. According to various examples, the user interface may be generated or built in response to the user of the mobile device 102 initiating or executing merchant application 104. As another example, the user interface may be generated or built when a user navigates to a merchant checkout page while within the merchant application 104. In response to the user interface being initiated, the mobile device 102 may transmit a mobile payment initiation message to the switch 130. For example, the mobile payment initiation message may indicate to the switch 130 that the user of the mobile device 102 has opened a merchant application 104. In response, the switch 130 may generate a list of valid digital wallet applications that may be used by any mobile device to make payment through the executing merchant application and transmit the list to the mobile device 102.

In response to receiving the list of possible valid digital wallets from the switch 130, the mobile device 102 may compare the list of valid digital wallets with digital wallets that are stored on and/or installed on or within the mobile device 102 (or within an operating system of the mobile device 102). Accordingly, the mobile device 102 may determine which digital wallets from the received list are installed on the mobile device 102. If the mobile device 102 detects a digital wallet from the list being installed on the mobile device 102, the mobile device 102 may include the detected digital wallet in a list of detected wallets and transmit a response to the switch 130 identifying the list of detected wallets to the switch 130. For example, the response may include an identification of the merchant application 104 being executed on the mobile device 102, a version of the merchant application, a timestamp, a list of digital wallets detected on the mobile device 102, and the like. The switch 130 receiving the list of digital wallets detected on the mobile device 102 may verify the list of wallets and transmit a response to the mobile device 102. For example, the response may include an identification of the merchant application, a version of the merchant application, a timestamp, and a signature including a private key. In this example, the transmissions between the mobile device 102 and the switch 130 may be directly, or they may be through other devices of a payment network such as the merchant server 120.

In response to receiving the response from the switch 130, the mobile device 102 may build or otherwise generate the user interface including data of each of the digital wallets, and each payment option of each wallet, which have been verified by the switch 130. For example, the mobile device 102 may build the mobile payment user interface screens 310, 320 and 330 shown in the examples of FIGS. 3A-3E. Accordingly, when the user navigates to the merchant checkout page 302, the mobile device 102 may embed the smart button 304 within the merchant checkout page 302 thus indicating to the user that the mobile payment user interface is available.

Figure 4:
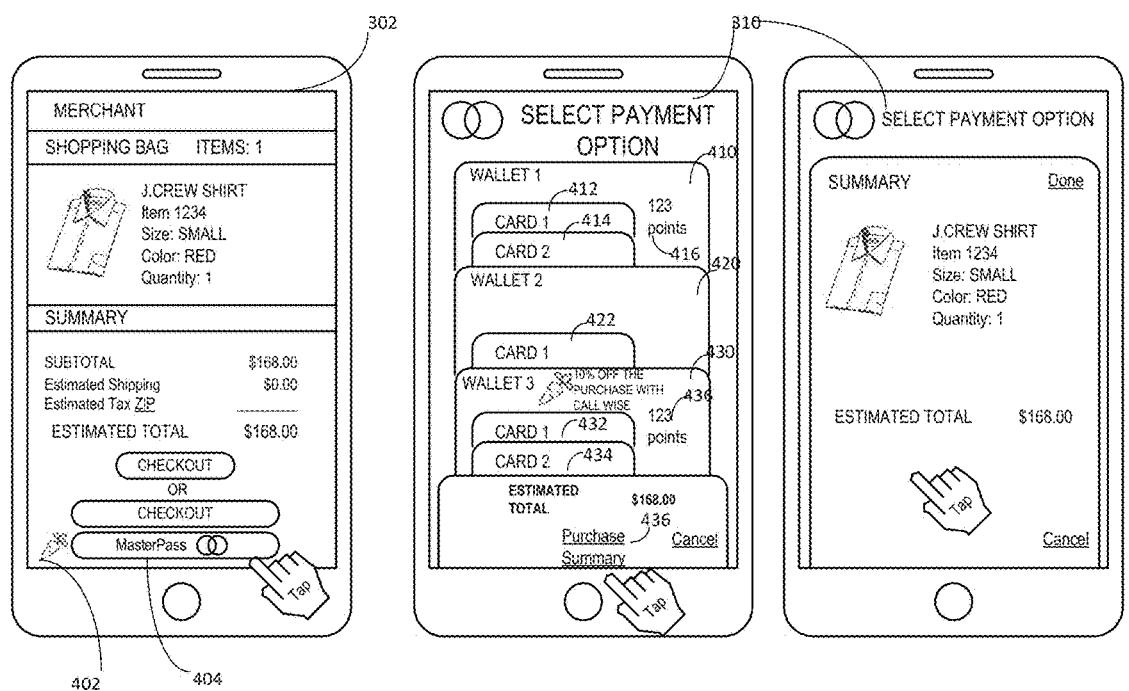

FIG. 4 illustrates a series of screen shots of a user interface showing various examples of viewing summary information and cancelling an interaction. FIG. 4 also shows examples that may be included within the payment option screen 310. Referring to FIG. 4, in the first screen, a user is presented with an initial screen display when the user is interacting with a merchant application (such as a merchant application 104 of FIG. 1) to initiate a purchase transaction. In this example, the user has selected items to purchase and has navigated to a checkout screen 302 within the application. In this example, incentives button 402 is shown on the screen next to smart button 404. If the user taps the incentives button 402, the promotional offers and/or rewards may appear next to different cards within the wallets as shown on the next slide. If the user taps the smart button 404 the user interface transitions to the next slide 310 using an animation in which a semi-transparent "smart container" may slide up (or down) from the bottom of the screen 310, depending on the context. In the second screen 310, the user then taps the link or screen area labeled "Purchase Summary" and a further animation occurs in which an overlay screen with a summary of the transaction slides up (or down) over the payment selections panel (depending on the context). The panel docks to the bottom of the screen when minimized. In this way, a user may easily and quickly view summary information about the transaction based on a specific wallet and payment card.

FIG. 4 further illustrates various examples of the payment option screen 310 in which graphical representations of a plurality of wallets are simultaneously displayed. Also simultaneously displayed are graphical representations of each of the payment cards included within each of the digital wallets. In this example, the first wallet is represented by graphical pane 410, the second wallet is represented by graphical pane 420, and the third wallet is represented by graphical pane 430. Furthermore, the first wallet includes first payment card 412 and second payment card 414, and incentives 416 displayed next to the first payment card 412. The second wallet includes first payment card 422 with rewards 426 displayed next to first payment card 422, and the third wallet includes first payment card 432 and second payment card 434 with incentives 436 displayed next to first payment card 432. The graphical pane 430 of the third wallet also includes an incentive of "10% off the purchase" as shown within the graphical pane 430 corresponding to the third wallet such that it is capable of being viewed separately from the representation of the payment cards included in the representation of the third wallet.

Figure 5:
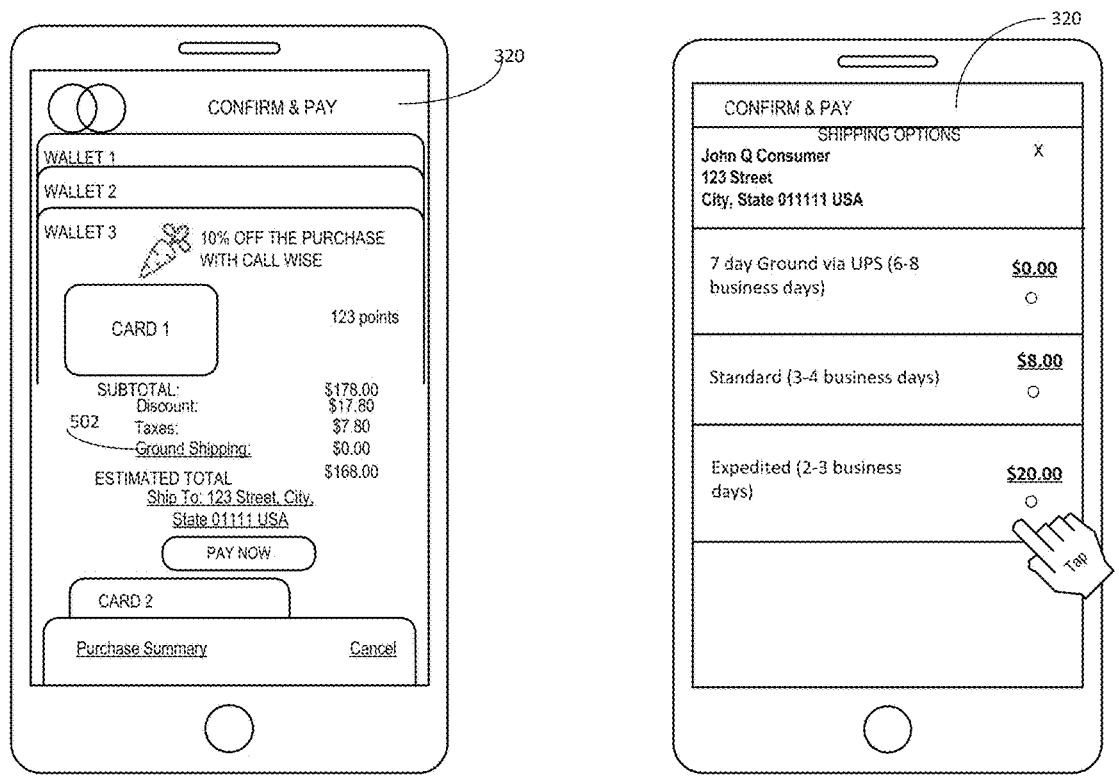

FIG. 5 illustrates a shipping option selection made through a user interface according to the exemplary embodiments. Referring to FIG. 5, a series of screens based on the payment conformation screen 320 are shown illustrating aspects of the user interface interaction for viewing and changing shipping options. In the first screen (i.e., left-hand side), a user is presented with a confirm and pay view pane 320 (similar to that discussed above in FIG. 3C), where a user has selected a desired digital wallet and payment instrument from the digital wallet and is further presented with details of the transaction including shipping address. The user is able to choose their shipping preference from a list of options sourced from the merchant application and displayed in the confirmation view pane 320 in the second screen (i.e., right-hand side) by tapping a link 502 shown on the first screen. If the user taps or selects the shipping preference link, an opaque panel or overlay appears over the confirm and pay section of the pane 320 and the user must complete an action to dismiss the pane (and return to the confirmation view pane). In this example, a user may select a desired shipping option by clicking a button shown on the screen.

Figure 6:
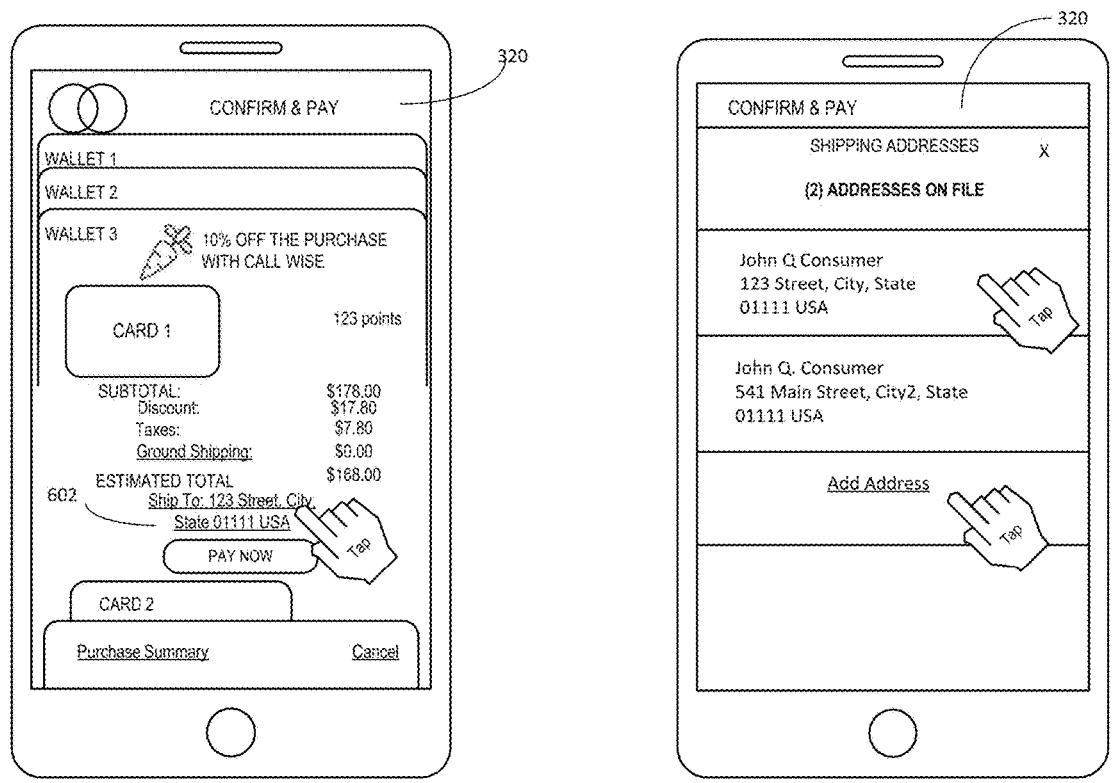

FIG. 6 illustrates a shipping address selection made through a user interface according to the exemplary embodiments. Referring to FIG. 6, a series of screens are shown illustrating aspects of the user interface interaction for viewing and changing a shipping address. In the first screen, a user is presented with a confirm and pay view pane 320 (similar to that discussed above in FIG. 3C and FIG. 5), where a user has selected a desired wallet and payment instrument and is presented with details of the transaction including shipping address illustrated by link 602. The user can select or tap on the address 602 in the confirmation view pane 320 to cause a shipping address modification panel to appear as an overlay. The user can interact with the shipping address modification panel to select between stored shipping addresses or to add a new shipping address. If a new shipping address is added, it will be made available for future use in conjunction with the wallet.

Figure 7:
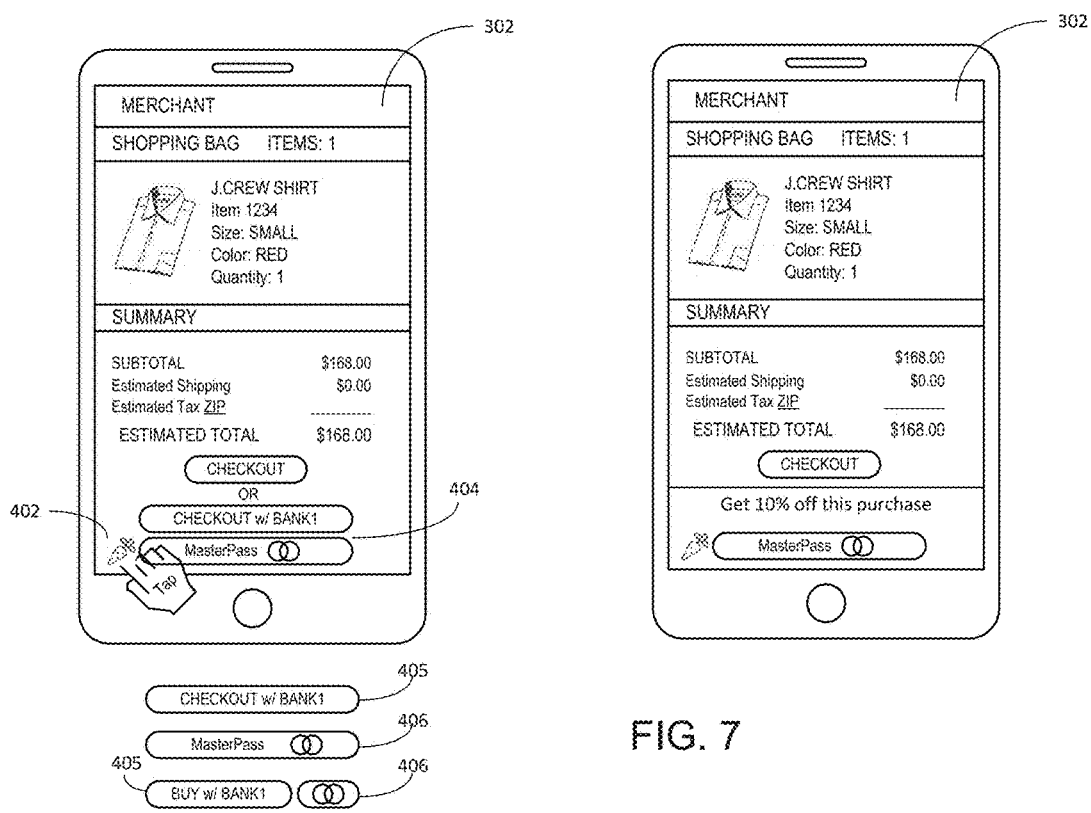

FIG. 7 illustrates an example in which screens and smart button options are shown illustrating aspects of the user interface interaction and button options that may be dynamically presented to a user based on different criteria. In FIG. 7, a user is viewing an initial screen display illustrating a user interface that may be presented to a user of a mobile device when interacting with a merchant application (such as a merchant application 104 of FIG. 1) to initiate a purchase transaction. At the bottom of the screen are different examples of smart button options. Pursuant to some embodiments, smart button 404 may be dynamically generated based on certain conditions of the transaction, the wallet application(s) and the merchant. Smart button 404 may be displayed when a plurality of digital wallet payment options are available. Furthermore, smart button 404 may be displayed with an icon 402 indicating that a digital wallet from among the plurality of digital wallets or issuer incentive is available. If a wallet or issuer incentive is available, the user may tap on the incentive icon 402 and a pane will be displayed (as shown in the right hand screen) providing details of the issuer level incentive (in the illustrative example, the transaction is eligible for an issuer level incentive of 10% off the purchase).

As another example, a single payment option smart button 405 may be displayed and may include, for example, a name of the payment card on the button 405. For example, if the user only has a single payment option available for the transaction (e.g., one digital wallet and one payment card), the button may include the name of the card corresponding to the single payment option. As another example, the single payment option smart button 405 may be displayed when the user has selected a preferred or default payment card from among a plurality of payment cards and digital wallets. In this case, the single payment option smart button 405 may enable the user to skip ahead and pay for a transaction using the preferred payment card.

As another example, a multiple payment option smart button 406 may be displayed if the consumer has more than one payment option available, and/or more than one wallet application on the mobile device 102, and has not made a purchase using the wallet via this merchant application before, or has made a purchase using the wallet via this merchant application but has not selected to re-use the previously used payment option. In this example, smart button 406 may correspond to smart button 404. According to various exemplary embodiments, a returning customer with multiple payment options available may be presented with a split button 405 and 406 where the left portion 405 of the button corresponds to a default or preferred selection of a payment option (e.g., payment card #1 from digital wallet #3). Also, the user can quickly view other payment options by interacting with the right hand side portion 406 of the button.

Figure 8A:
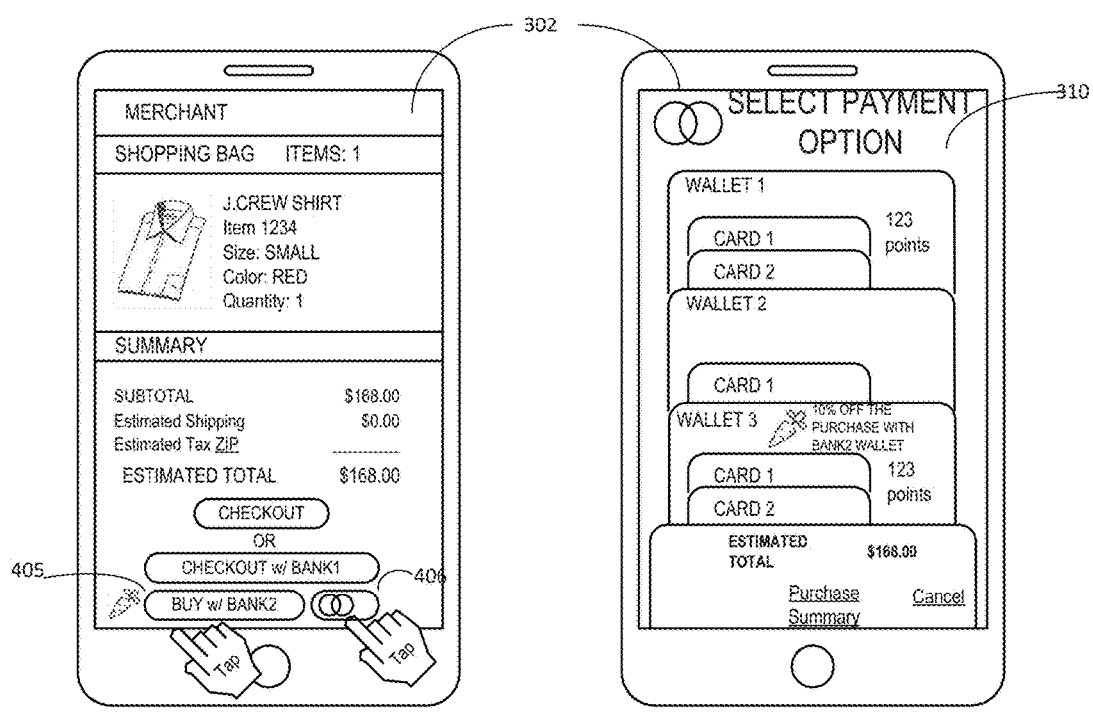
Figure 8B:
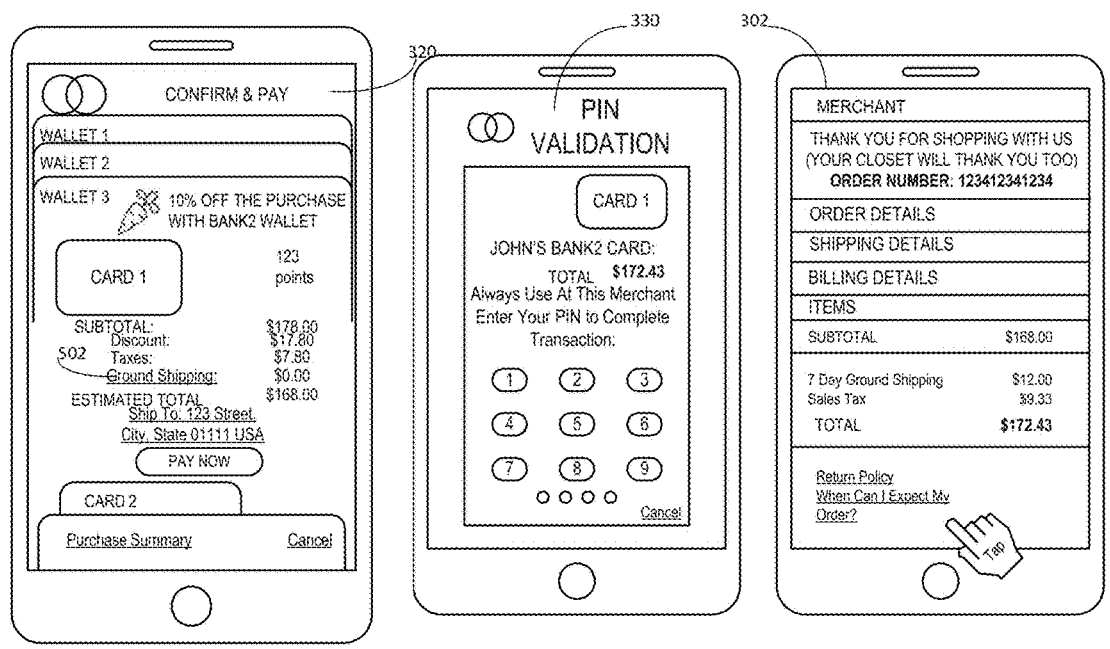

FIGS. 8A and 8B illustrate examples of a second smart button 405 that may be provided in a merchant checkout screen in accordance with an exemplary embodiment. In FIG. 8A, the second smart button 405 corresponds to the left portion of the split button shown in FIG. 7.

Referring to FIGS. 8A and 8B, a cardholder may select to use a payment card associated with a digital wallet during a first transaction or during a prior transaction with the merchant. According to various aspects, the selected payment card may be remembered by the payment application, merchant application, the mobile device itself, and the like. For example, the cardholder may use payment card #1 from digital wallet #3 during a payment process while making a purchase using merchant application 104 shown in FIG. 1. In response, an identifier of the payment card #1 associated with the merchant application 104 may be stored in the storage of the mobile device 102. As another example, the identifier of payment card #1 associated with the merchant application 104 may be transmitted by the mobile device to a merchant server, a switch, and the like. Accordingly, the use of the payment card #1 from digital wallet #3 with the merchant application 104 may be remembered.

When the cardholder re-navigates (i.e., returns) to the checkout page of merchant application 104, for example, to make a second purchase or to perform a second checkout process, the second smart button 405 may be displayed next to smart button 406. In this example, the second smart button 405 corresponds to payment card #1 associated with digital wallet #3 which was previously used by the cardholder during the previous transaction with the merchant application. Also, smart button 406 corresponds to smart button 304 shown in FIG. 3A. As a result, the cardholder may select second smart button 405 and skip ahead directly to validation screen 330. That is, the cardholder may elect to skip payment option screen 310 and confirm and pay screen 320 and proceed directly to validation screen 330 of the user interface according to various embodiments while simultaneously selecting payment card #1 from digital wallet #3 as a method of payment for the second transaction. As another example, the selected second smart button 405 may automatically trigger payment of the second transaction using payment card #1 from digital wallet #3 and further skip passed validation screen 330, as well as payment option screen 310 and confirm and pay screen 320.

Figure 9:
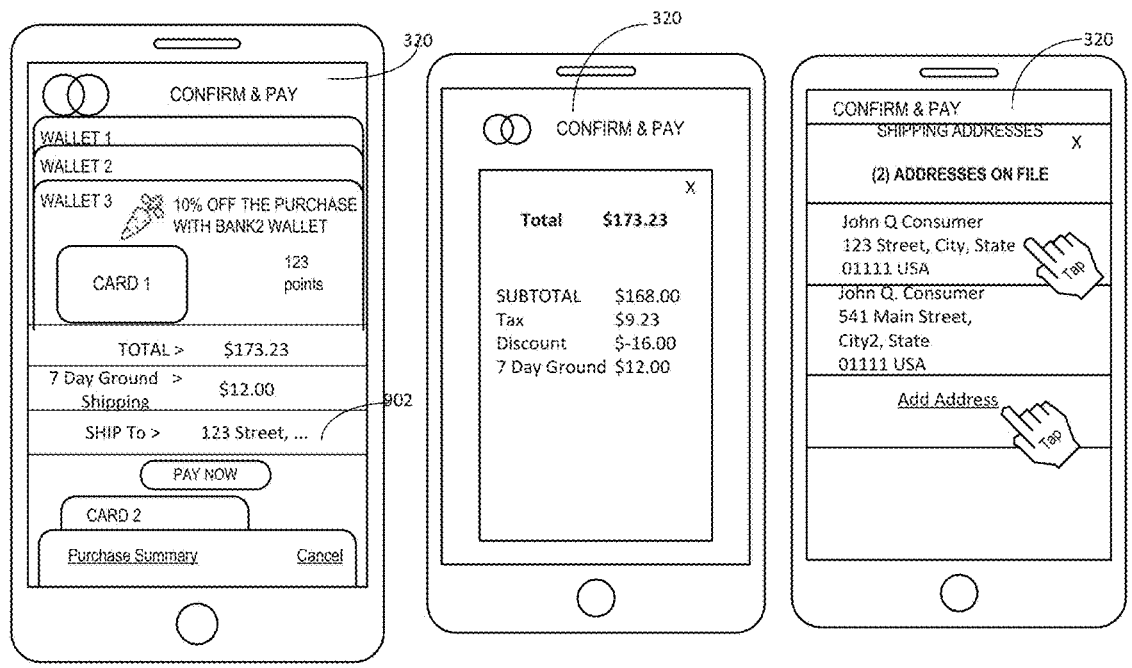

FIG. 9 illustrates an example of viewing and changing a shipping address in accordance with another exemplary embodiment. Referring to FIG. 9, the confirm and pay screen 320 indicates that payment card #1 from digital wallet #3 has been selected by the user. In this example, the confirm and pay screen 320 shows a brief summary of the total price (i.e., purchase summary), a shipping option, and a shipping address, all of which may be selected and edited by a user, for example, by tapping on a hyperlink corresponding thereto. In this example, link 902 may be selected by the user to change the shipping address. Accordingly, a user may choose from an already existing shipping address, add a new shipping address, delete an old shipping address, and the like. According to various exemplary embodiments, if an address from a first digital wallet is changed or deleted, the same address may also be changed or deleted in other digital wallets having that same address stored therein. As another example, if a new address is added, the exemplary embodiments may also add the new address to the other digital wallets.

Figure 10:
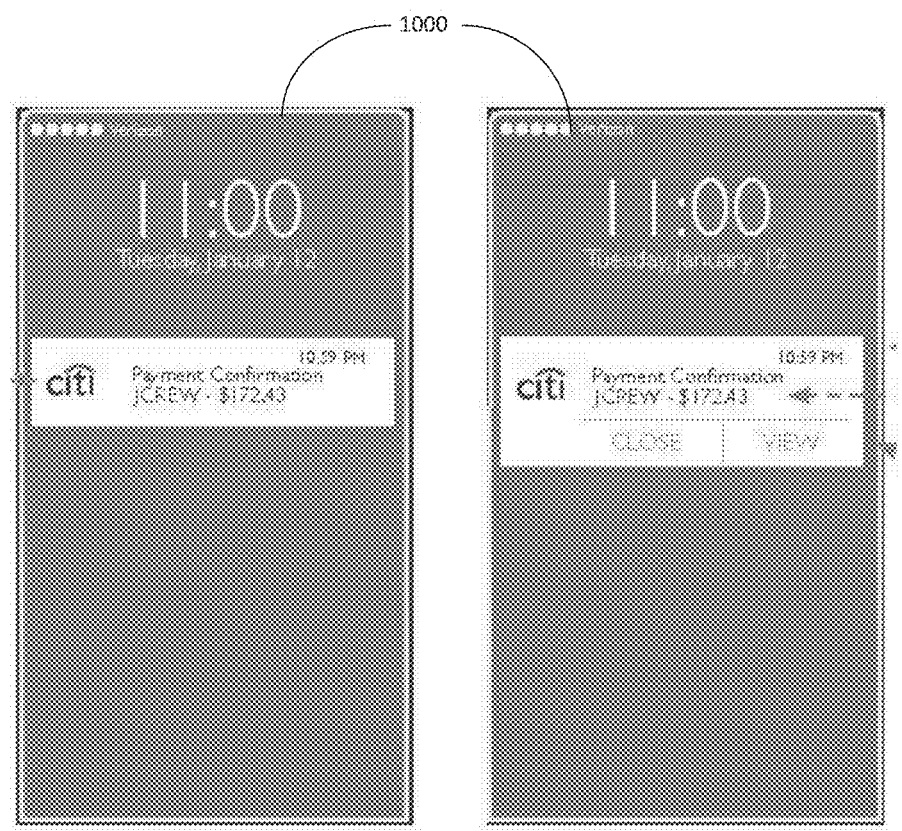
Figure 11:
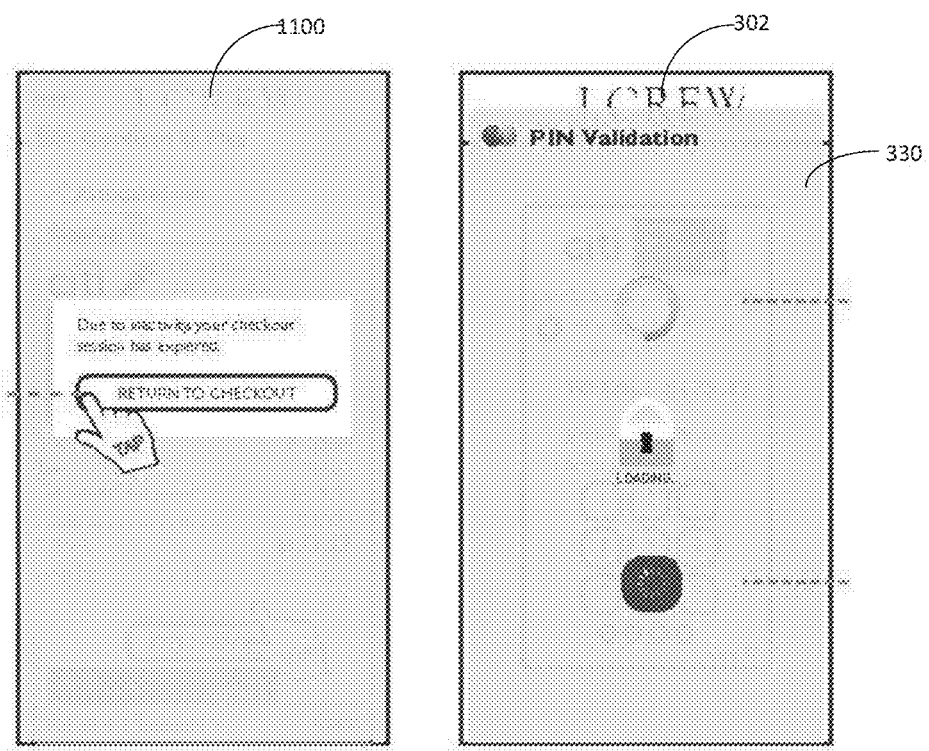

FIG. 10 illustrates an example of a lock screen in accordance with an exemplary embodiment and FIG. 11 illustrates an example of a timeout screen in accordance with an exemplary embodiment. Referring to FIG. 10, a notification of payment may be displayed on a lock screen of a mobile device to notify the user of a payment confirmation, for example, when payment has cleared or has been successfully processed. The notification may include the total price, the merchant name, a timestamp, and the like. A user may select the notification from the lock screen and additional actionable buttons may be revealed allowing the user to take action from the lock screen. For example, a view button may be revealed, a close button may be revealed, and the like. In the event that the user is inactive for a predetermined amount of time during a checkout process, the checkout session may be timed out and the user may be notified by the timeout screen shown in FIG. 11. For example, the notification may be displayed automatically or when the user returns to the checkout process. A button may be displayed that prompts the user to restart or resume the checkout process. Furthermore, if the user decides to resume or restart the checkout process, a visual indicator such as a progress bar or other indicator may be used to show the user an expected duration of time or delay before the process is resumed.

Figure 12:
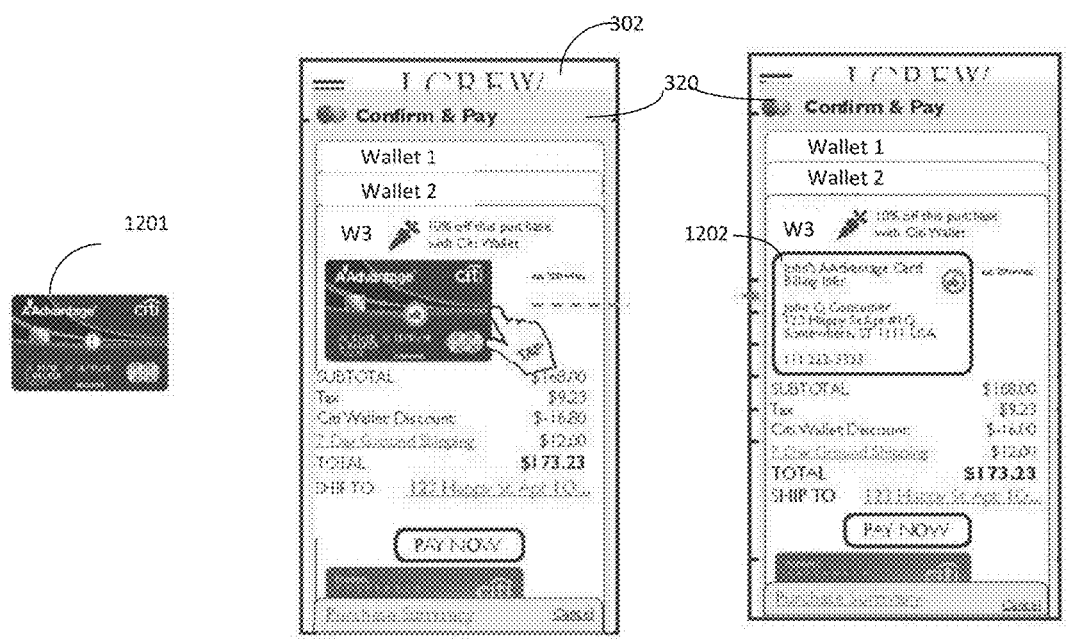

FIG. 12 illustrates a view of billing information of a payment card in accordance with an exemplary embodiment. Referring to FIG. 12, a user may be notified when payment card information has become invalid or is not up to date. For example, in FIG. 12, payment card 1201 may be determined to have an expiration date that has become expired. Accordingly, information indicating that the expiration date is no longer valid and a request may be shown to the user through the confirm and pay screen 320, or in another screen. Accordingly, the consumer can update the payment card. In some cases, the payment application may require the user to update the payment card information before the payment process can be continued. Also, on the right-hand side of FIG. 12, card information and user information stored on the back of a payment card such as payment card 1202 may be displayed by a selection of the user. For example, the user may tap on a particular portion of the payment card on the screen, or make a particular tap gesture, and cause the payment card to flip over on the screen revealing account information from the other side of the payment card. Accordingly, a user may be shown various details about the payment card that are not available on the front side of the payment card, for example, billing information, an account number, an expiry, and the like.

According to various exemplary embodiments, provided is a system which allows increased convenience and ease of interaction for consumers, allowing them to quickly view and select the most appropriate or desired payment option for transactions with merchants. When a plurality of options are available. Rather than a cardholder individually accessing each digital wallet included in a mobile device to determine an appropriate digital wallet for a transaction, the exemplary embodiments provide a pay wall or combined payment option screen that simultaneously displays each digital wallet and each payment card included in the respective digital wallets. Also, digital wallet incentives, payment card incentives, and/or the like may be simultaneously displayed allowing a user to easily determine which digital wallet and/or payment card provides them with the best incentive with respect to a merchant transaction.

As used herein, devices, including those associated with the transaction processing system 100 and any other device described herein, may exchange information via any communication network which may be one or more of a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

As used herein, the terms card, transaction card, financial transaction card, payment card, and the like, refer to any suitable transaction card or account, such as a credit card, a debit card, a prepaid card, a charge card, a membership card, a promotional card, a frequent flyer card, an identification card, a gift card, a deposit account, and the like. As another example, the terms may refer to any other device or media that may hold payment account information, such as mobile phones, Smartphones, personal digital assistants (PDAs), key fobs, computers, and the like. The transaction card can be used as a method of payment for performing a transaction.

Also, the term "payment card system" refers to a system that may include a switch for handling purchase transactions and related transactions and operated under the name of MasterCard, Visa, American Express, Diners Club, Discover Card or a similar system. In some embodiments, the term "payment card system" may be limited to systems in which member financial institutions issue payment card accounts to individuals, businesses and/or other organizations. A number of trademark or brand names are used in the drawings and the specification to refer to example products, and it is the applicant's intent to provide proper attribution to those trademark owners.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A mobile payment method comprising:
   receiving, from a central system, a list of valid digital wallets that are capable of being used by a mobile device to make a payment with a merchant;
   determining which valid digital wallets from the received list are locally installed on the mobile device; and
   in response to determining that a plurality of digital wallets are locally installed on the mobile device, displaying a smart button with a merchant checkout page,
   wherein when the smart button is selected by a user of the mobile device, the method further comprises displaying a payment option selection screen that enables the user to select a payment card associated with any digital wallet from among the plurality of digital wallets locally installed as a method of payment for the transaction, wherein the method further comprises receiving a selection of a payment card of a digital wallet from the user through the payment option selection screen, and in response to determining that the user of a mobile device is re-navigating to the merchant checkout page, further displaying a second smart button on the merchant checkout page which enables the user to bypass the payment option selection screen and make payment using the previously selected payment card of the digital wallet.

2. The mobile payment method of claim 1, wherein the merchant checkout page is provided by a merchant mobile application that is being executed by the mobile device, and the displaying comprises overlaying the payment option selection screen on top of the merchant checkout page.

3. The mobile payment method of claim 1, wherein the displayed payment option selection screen enables the user to select any payment card from any digital wallet from among the plurality of digital wallets as the method of payment for the transaction.

4. The mobile payment method of claim 1, wherein the payment option selection screen displays an identifier of each digital wallet and an identifier of each payment card within each digital wallet.

5. The mobile payment method of claim 4, wherein the identifier of each digital wallet comprises at least one of a name and a logo of an organization associated with the digital wallet.

6. The mobile payment method of claim 1, wherein each digital wallet is represented on the payment option screen as a graphical pane, and a graphical pane corresponding to a firstly displayed digital wallet partially overlaps a graphical pane corresponding to a secondly displayed digital wallet.

7. The mobile payment method of claim 1, wherein the displayed payment option selection screen displays an incentive available for at least one payment card within each digital wallet.

8. A mobile device comprising:
a display screen;
a network interface configured to receive, from a central system, a list of valid digital wallets that are capable of being used by a mobile device to make a payment with a merchant; and
a processor configured to determine which valid digital wallets from the received list are locally installed on the mobile device, and, in response to determining a plurality of digital wallets are locally installed on the mobile device, cause the display screen to display a smart button on the merchant checkout page,
wherein, in response to the smart button being selected by the user, the processor is further configured to cause the display screen to display a payment option selection screen simultaneously displaying a representation of each digital wallet from among a plurality of digital wallets locally installed on the mobile device, and simultaneously displaying a user selectable representation of each payment card included in each respective digital wallet,
the processor is further configured to receive a selection of a payment card of a digital wallet from the user through the payment option selection screen, and
in response to determining that the user of a mobile device is re-navigating to the merchant checkout page, the processor is further configured to display a second smart button on the merchant checkout page which enables the user to bypass the payment option selection screen and make payment using the previously selected payment card of the digital wallet.

9. The mobile device of claim 8, wherein the merchant checkout page corresponds to a merchant mobile application being executed by the processor, and the payment option selection screen is displayed independently and on top of the merchant checkout page.

10. The mobile device of claim 8, wherein the displayed payment option selection screen enables the user to select any payment card from any digital wallet from among the plurality of digital wallets as a method of paying for a transaction on the merchant checkout page.

11. The mobile device of claim 8, wherein the displayed payment option selection screen further displays an identifier of each digital wallet and an identifier of each payment card within each digital wallet.

12. The mobile device of claim 8, wherein each digital wallet is represented on the payment option selection screen as a graphical pane, and a graphical pane corresponding to a firstly displayed digital wallet partially overlaps a graphical pane corresponding to a secondly displayed digital wallet.

13. The mobile device of claim 8, wherein the displayed payment option selection screen further displays an incentive available for at least one payment card within each digital wallet.

14. A mobile payment method comprising:
determining that a user of a mobile device is at or is navigating to a merchant checkout page on a display screen;
determining that a plurality of digital wallets capable of being used for payment on the merchant checkout page are locally installed on the mobile device based on a list of valid digital wallets received from a central system;
displaying a smart button on the merchant checkout page; and
in response to the smart button being selected by the user, displaying a payment option selection screen simultaneously displaying a representation of each digital wallet from among a plurality of digital wallets locally installed on the mobile device, and simultaneously displaying a user selectable representation of each payment card included in each respective digital wallet,
wherein the method further comprises receiving a selection of a payment card of a digital wallet from the user through the payment option selection screen, and
in response to determining that the user of a mobile device is re-navigating to the merchant checkout page, further displaying a second smart button on the merchant checkout page which enables the user to bypass the payment option selection screen and make payment using the previously selected payment card of the digital wallet.

15. The mobile payment method of claim 14, wherein the merchant checkout page corresponds to a merchant mobile application being executed by the processor, and the payment option selection screen is displayed independently and on top of the merchant checkout page.

16. The mobile payment method of claim 1, wherein the displaying the payment option selection screen comprises simultaneously displaying independent representations of at least two digital wallets that are currently installed on the mobile device within a same viewing area.

17. The mobile payment method of claim 16, wherein the displaying the payment option selection screen further comprises displaying independent representations of respective payment cards provisioned within each of the at least two digital wallets within the same viewing area.

18. The mobile payment method of claim 1, wherein the determining comprises determining which valid digital wallets received from the list are installed within a mobile operating system of the mobile device.

\* \* \* \* \*